Jan. 2, 1923.

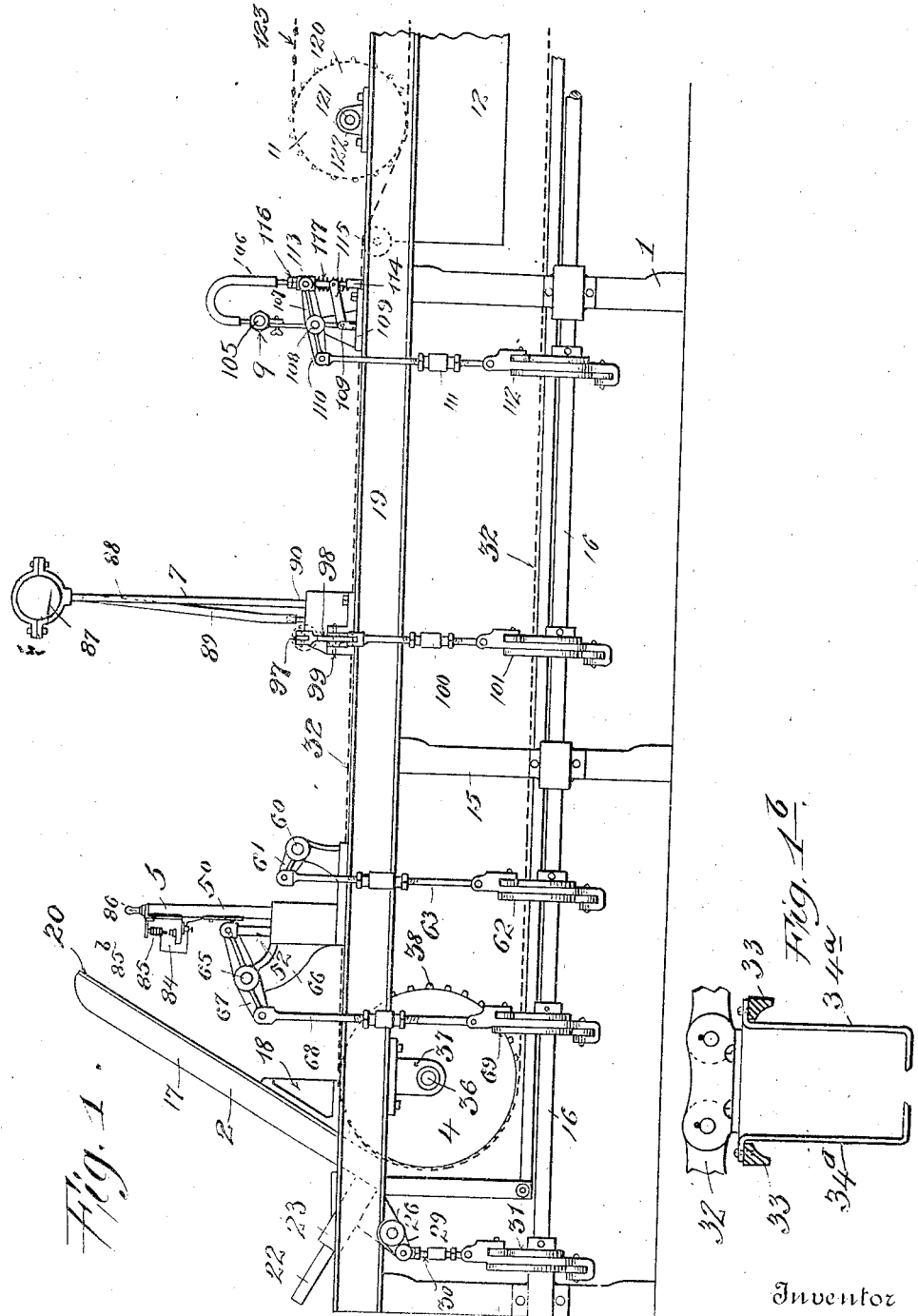

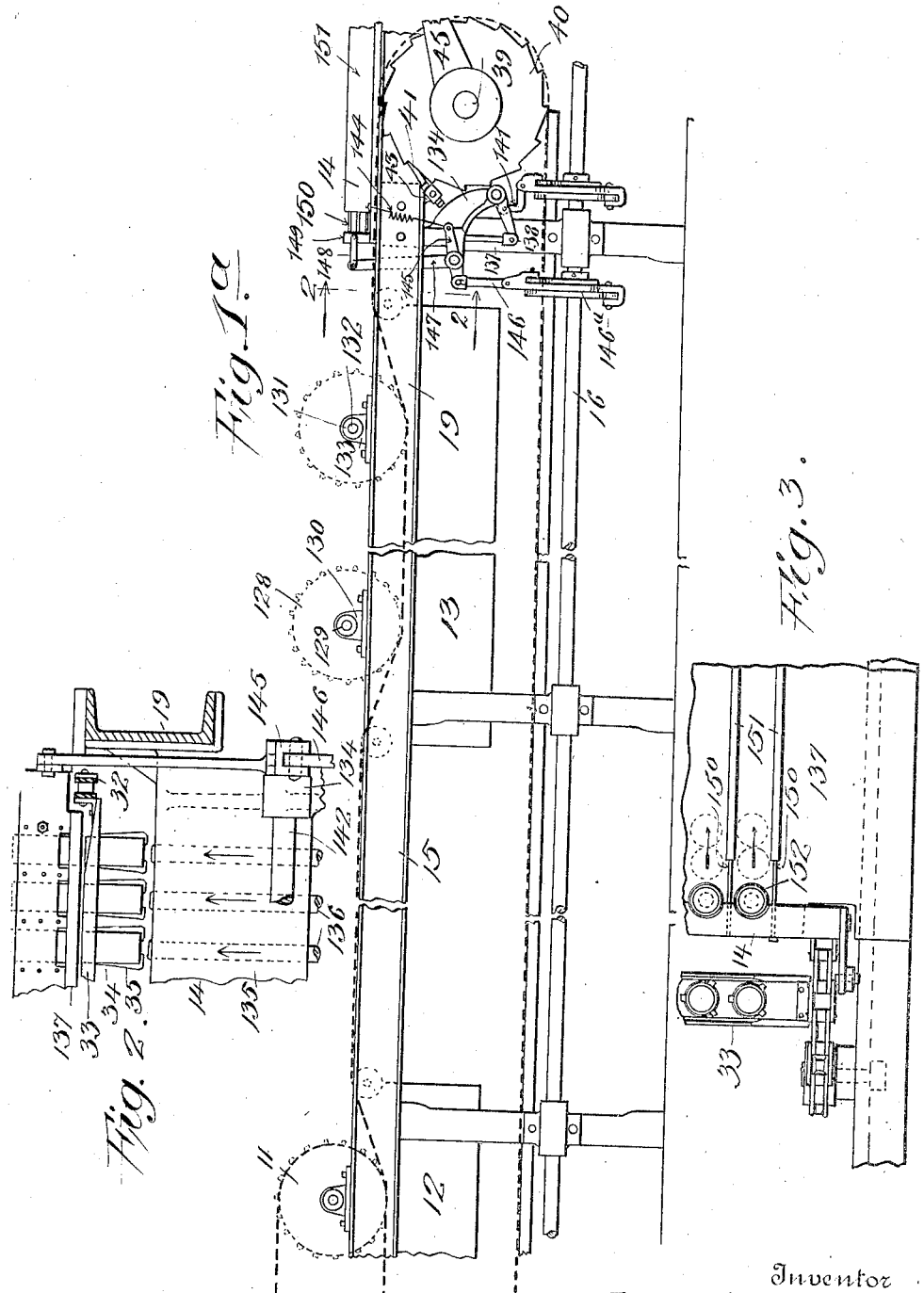

L. A. FREEDMAN.
DRY BATTERY MACHINE.
ORIGINAL FILED MAY 13, 1916.

Inventor
Louis A. Freedman
By his Attorney
Joseph L. Levy

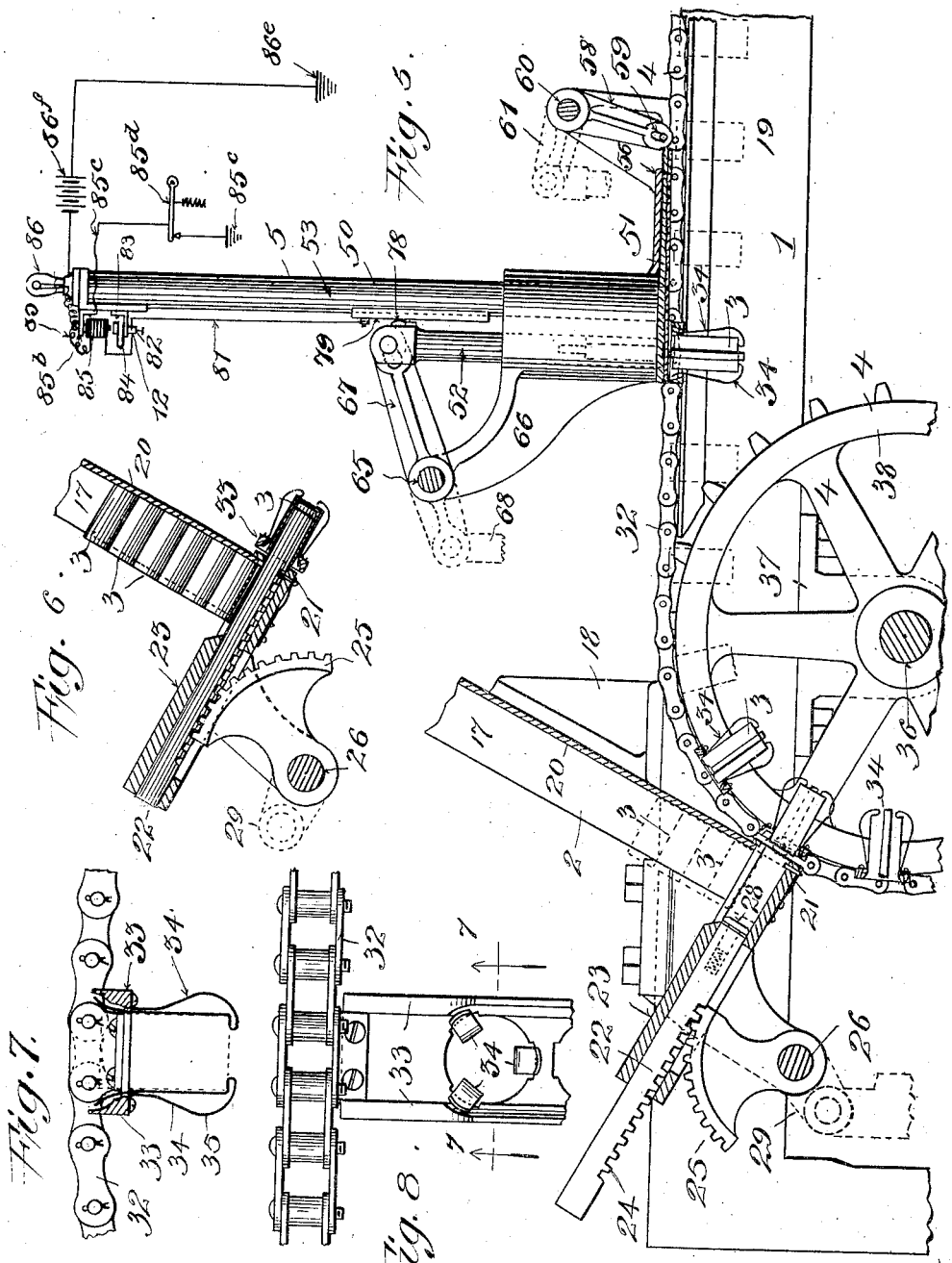

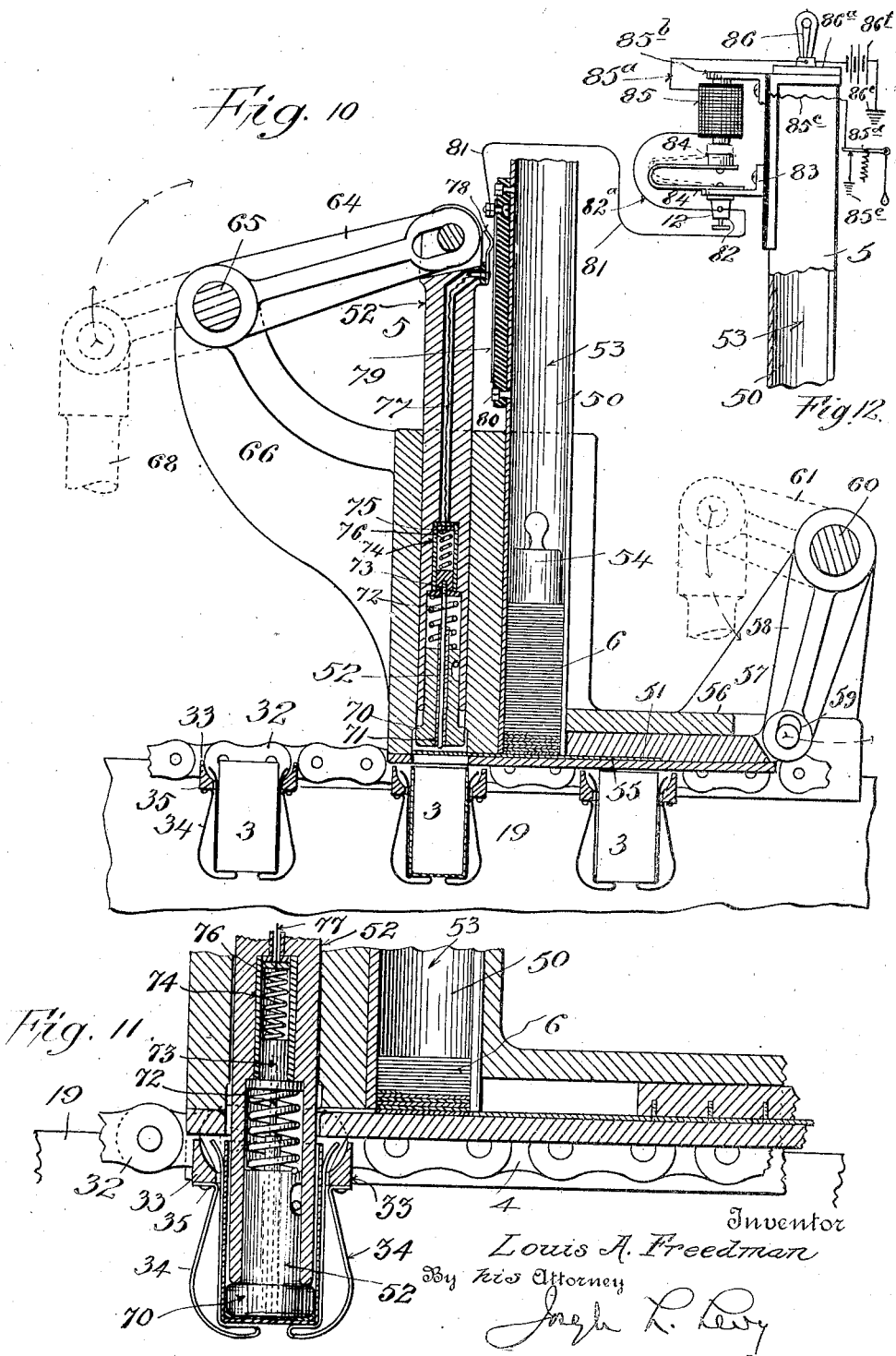

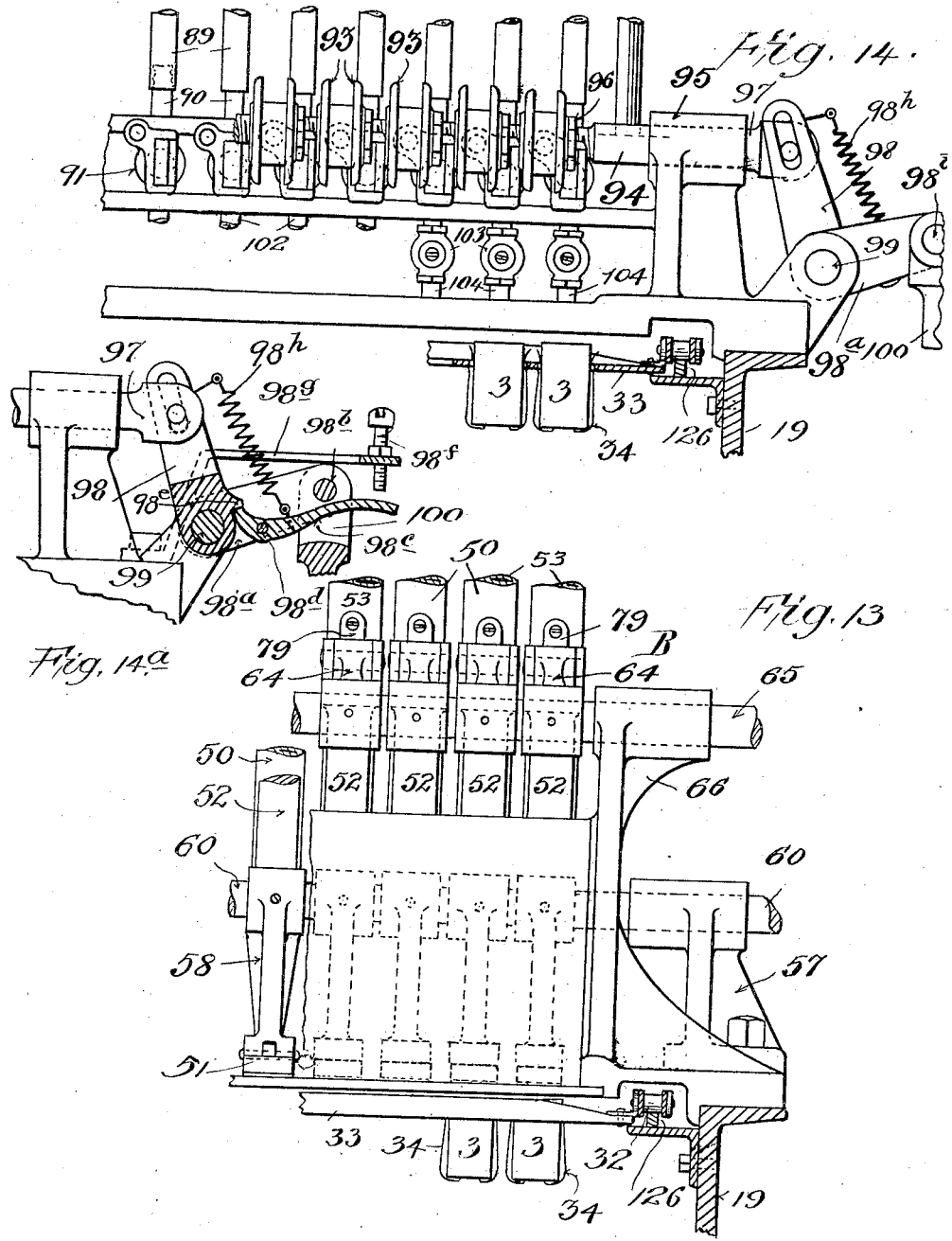

Jan. 2, 1923.
L. A. FREEDMAN.
DRY BATTERY MACHINE.
ORIGINAL FILED MAY 13, 1916.
1,440,668
11 SHEETS-SHEET 8
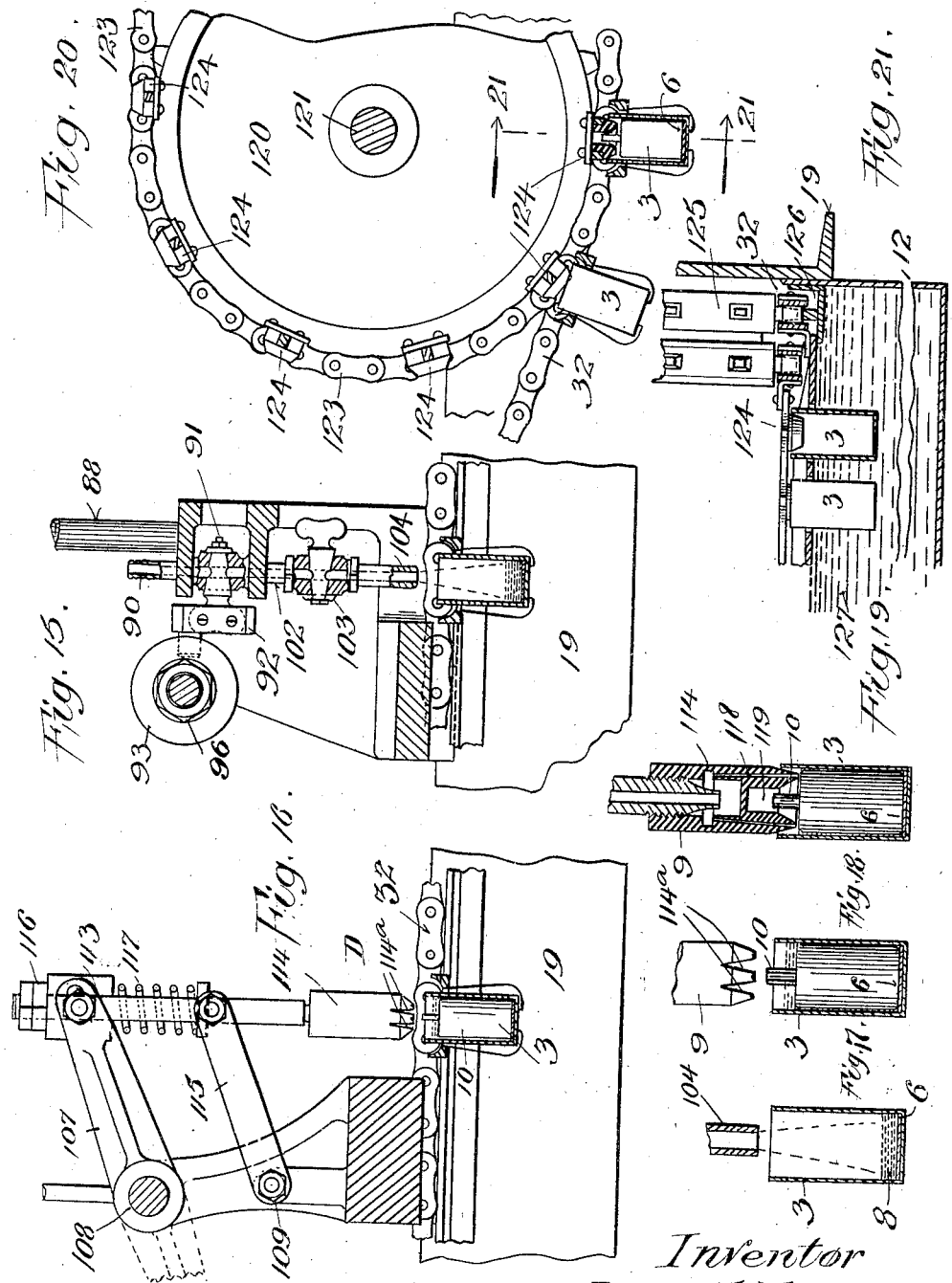
Inventor
Louis A. Freedman
by his atty Jan. 2, 1923.
L. A. FREEDMAN.
DRY BATTERY MACHINE.
ORIGINAL FILED MAY 13, 1916.
1,440,668
11 SHEETS-SHEET 9
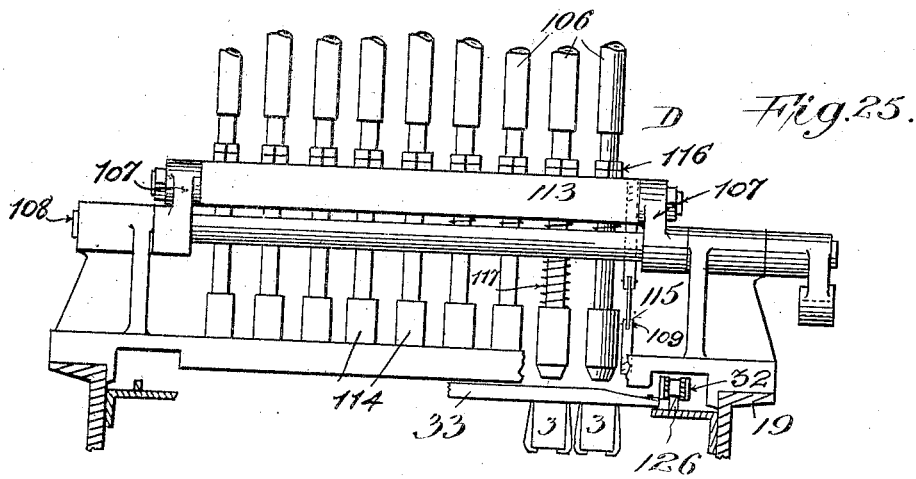
Fig. 25.
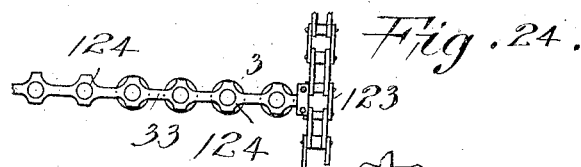
Fig. 24.
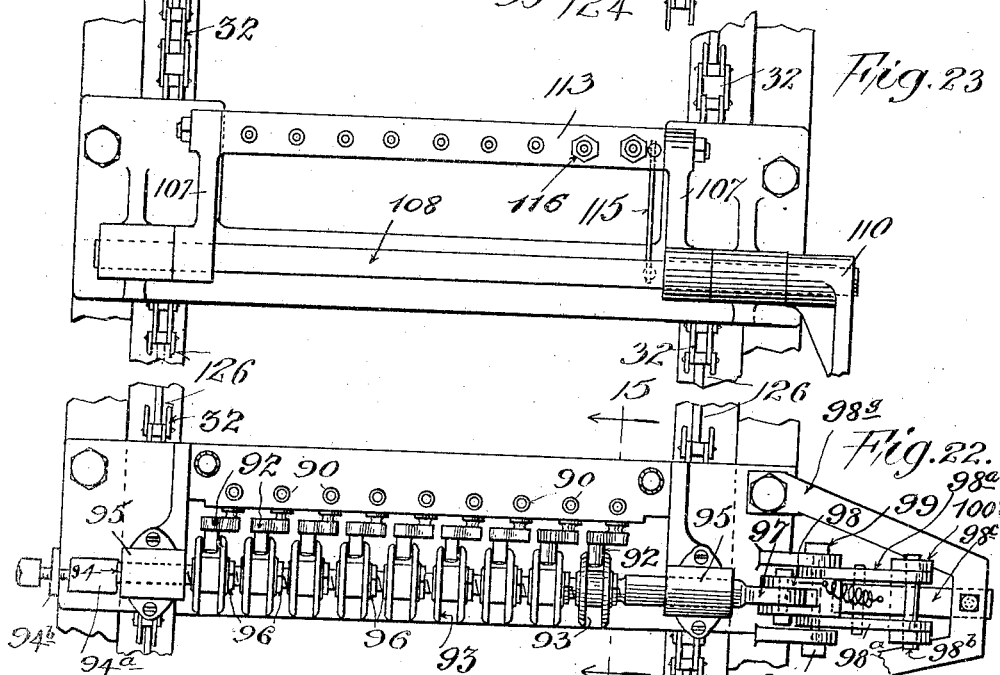
Fig. 23.
Fig. 22.
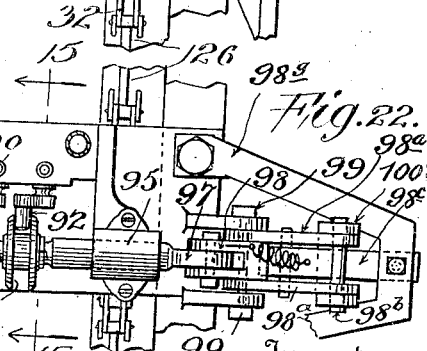
Inventor
Louis A. Freedman
By his Attorney

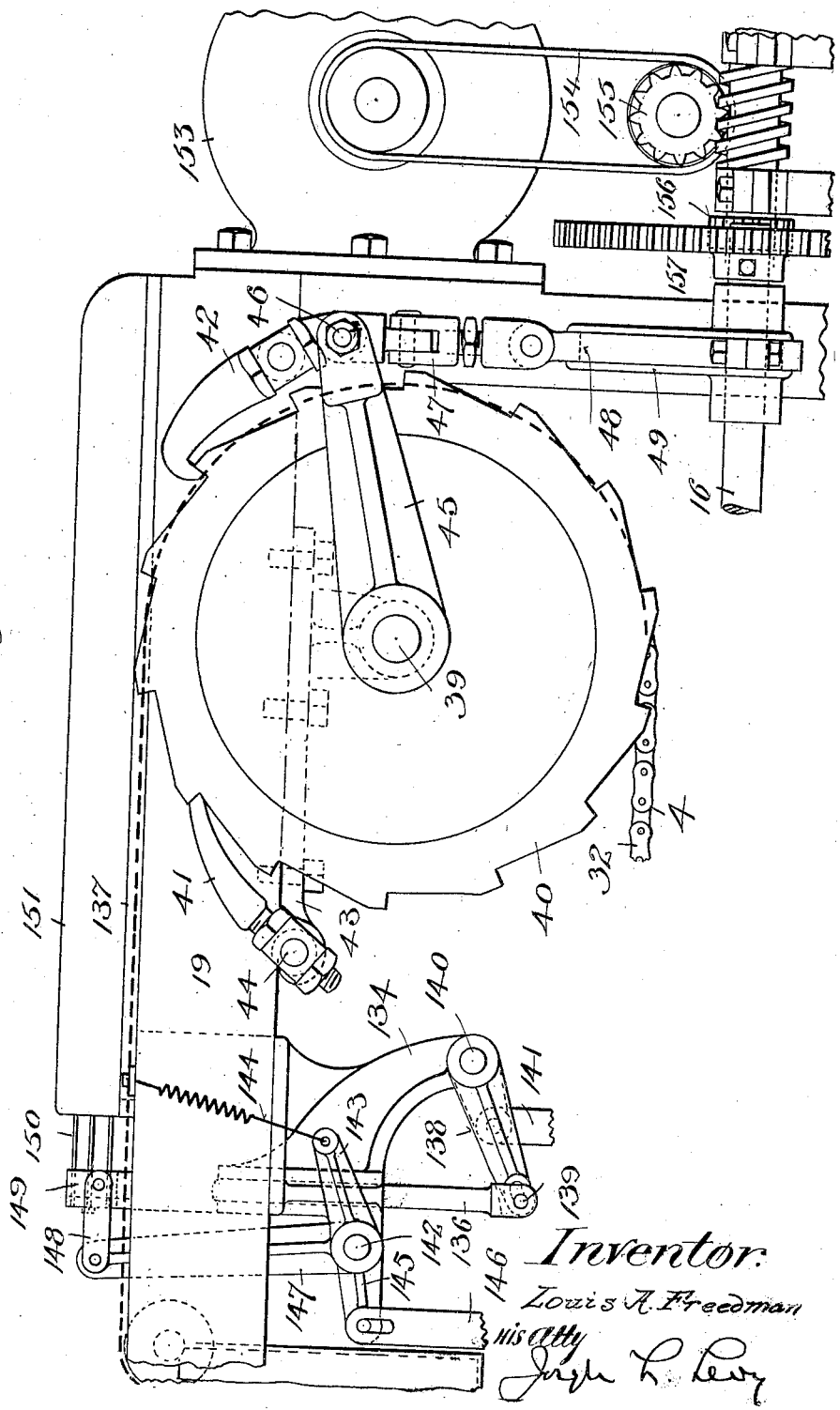

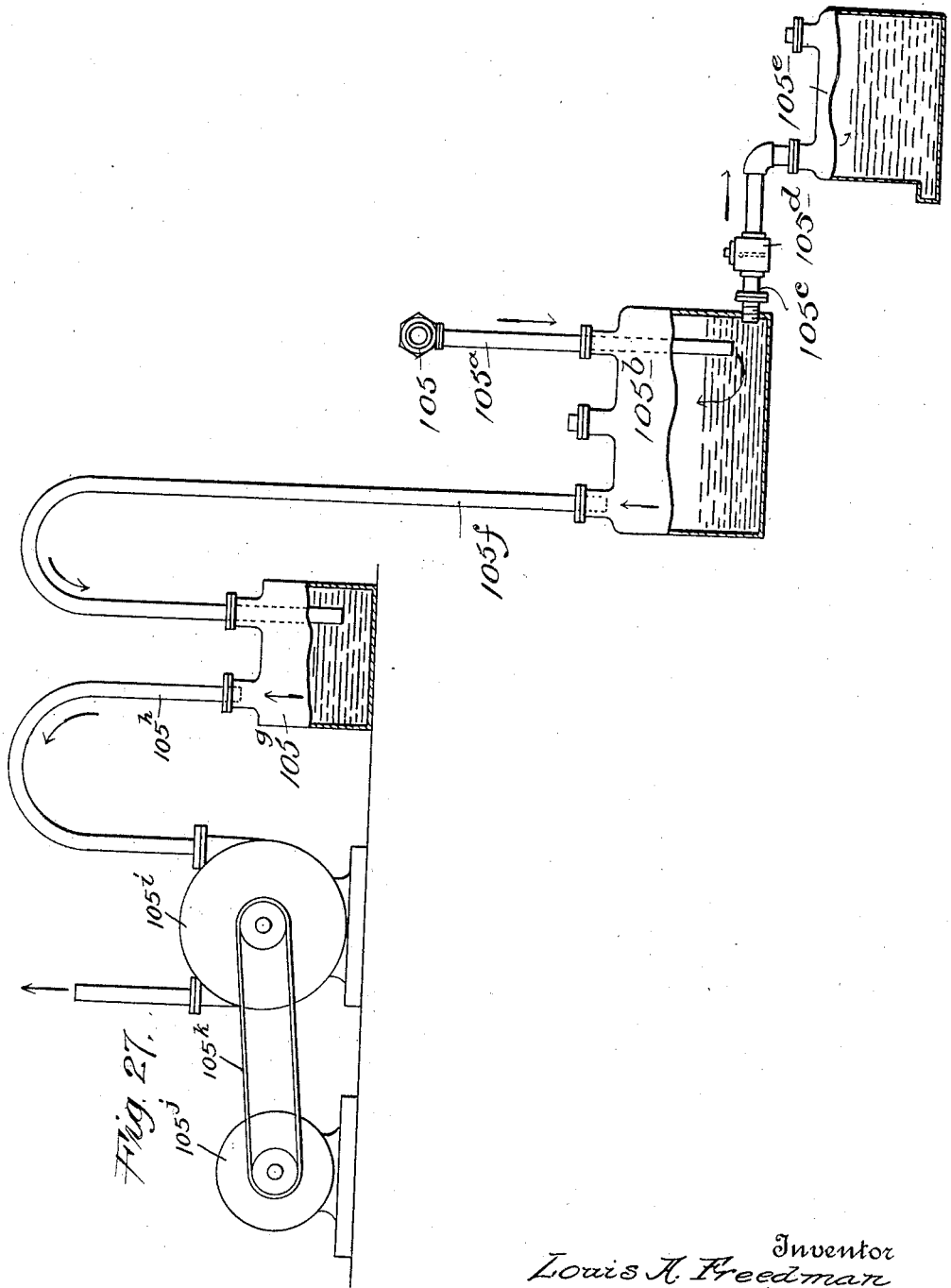

Patented Jan. 2, 1923.

1,440,668

UNITED STATES PATENT OFFICE.

LOUIS A. FREEDMAN, OF NEW YORK, N. Y.

DRY-BATTERY MACHINE.

Application filed May 13, 1916, Serial No. 97,441. Renewed May 27, 1922. Serial No. 564,219.

*To all whom it may concern:*

Be it known that I, LOUIS A. FREEDMAN, a citizen of the United States, and a resident of the city, county, and State of New York, (whose post-office address is 135 West 86th Street, in said city,) have invented a certain new and useful Improvement in Dry-Battery Machines, of which the following is a specification.

The object of my invention is to provide a machine which will assemble together the parts of a dry battery, provide for the cooling and solidifying of the liquid part of the battery, and if necessary, provide for the cooling of any liquid parts before the battery leaves the machine. This object is accomplished by my invention, one embodiment of which is hereinafter set forth.

For a more particular description of my invention, reference is to be had to the accompanying drawings, forming a part hereof, in which Fig. 1 is a side elevation showing the front end of the machine and Fig. 1ª is a similar side elevation showing the rear end of the machine;

Fig. 1ᵇ shows a detail of construction.

Fig. 2 is a sectional view, taken on the line 2—2 of Fig. 1ª, looking in the direction of the arrows, and showing the cup ejector hereinafter described.

Fig. 3 is a plan view of a portion of the cup ejector structure, shown in Fig. 2;

Fig. 5 is a sectional view, taken on the line 5—5 of Fig. 4, looking in the direction of the arrows, showing the cup feeding and cardboard washer supplying assemblies.

Fig. 6 shows a detail of the magazine and mechanism for loading the cups into the clip holders on crosspieces of the conveyor.

Fig. 7 shows a portion of the conveyor showing the clips used to hold the cups in cross-pieces, the view being a sectional one taken on the line 7—7 of Fig. 8, looking in the direction of the arrows.

Fig. 8 is a plan view of the structure shown in Fig. 7, showing conveyor chain attached to cup cross-piece.

Fig. 10 is an enlarged sectional view on the line 10—10 of Fig. 4, looking in the direction of the arrows.

Fig. 11 is an enlarged sectional view of a portion of the mechanism shown in Fig. 10, the mechanism being in a different position.

Fig. 12 shows an electrical indicator which indicates when cardboard washers have been exhausted from the magazine, or for any other reason a washer is not inserted in the bottom of the cup.

Fig. 13 is a sectional view, taken on the line 13—13 of Fig. 4, looking in the direction of the arrows, showing elevation of mechanism for supplying cardboard washer to cell.

Fig. 14 is a sectional view showing a portion of the mechanism used for filling solution into the cups.

Figure 4:
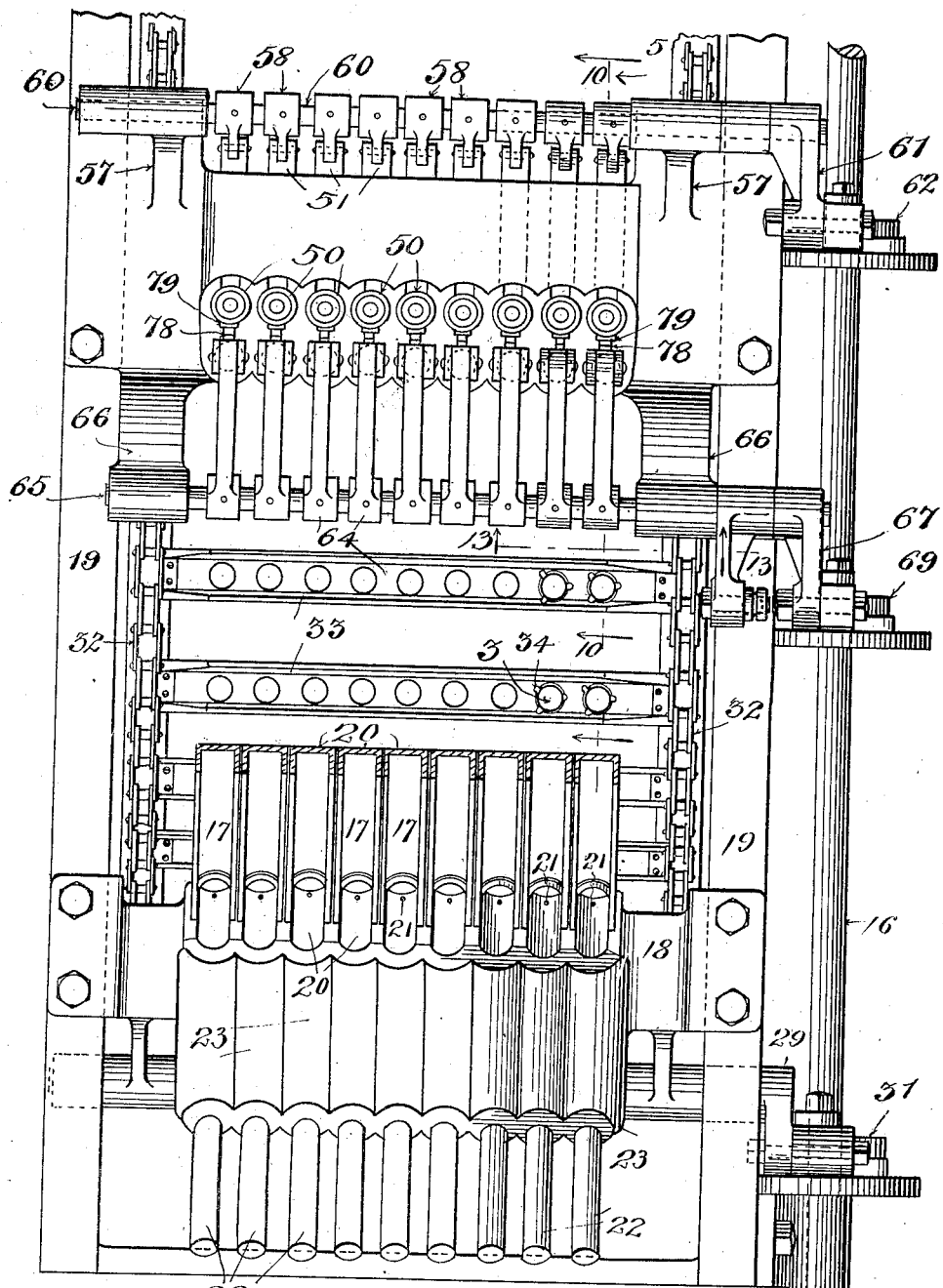
Fig. 4 is an enlarged plan view of the front of my machine.
Figure 9:
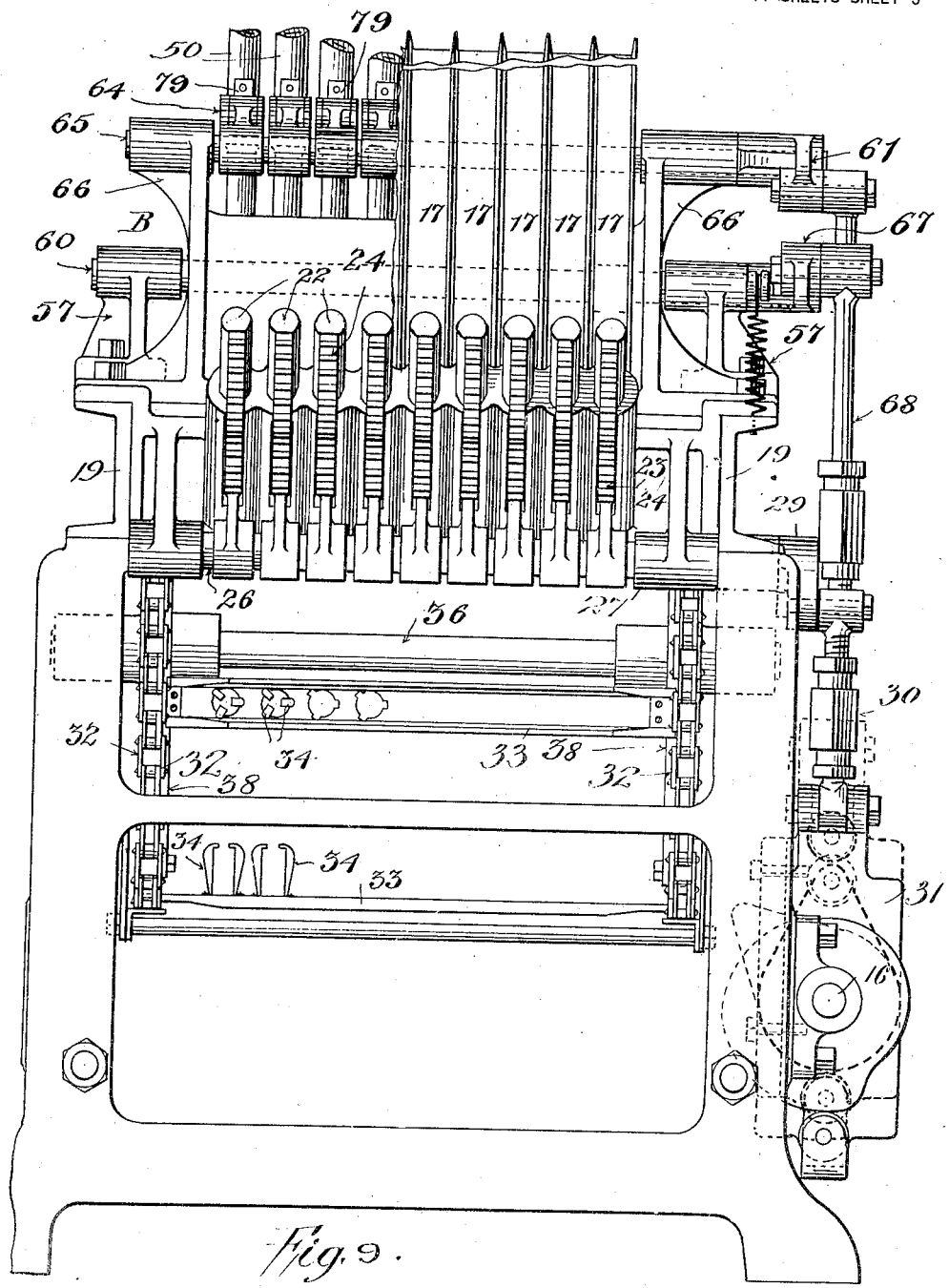
Fig. 9 is a front elevation of my improved machine.

Fig. 14ª shows a detail of the tripping mechanism for shutting off the valves properly.

Fig. 15 is a sectional view taken at right angles to Fig. 14, and likewise shows a portion of the solution filling mechanism. The sectional line on which Fig. 15 is shown is taken at 15—15 of Fig. 22, looking in the direction of the arrows.

Fig. 16 is a sectional view of a portion of the suction mechanism which removes the surplus solution from each cell.

Fig. 17 is a sectional view showing the cup or cell being filled.

Fig. 18 shows the cup or cell after the liquid has been inserted and the core put in place whereby the upper level of the liquid has been raised.

Fig. 19 is a sectional view of the structure shown in Fig. 18 with the suction device lowered and shown in section.

Fig. 20 is a sectional view showing a link belt mechanism for applying a straightener and centering device for putting the cores in their true positions prior to the cooking and hardening of the liquid.

Fig. 21 is a sectional view, taken at the place indicated on the sectional line 21—21 of Fig. 20.

Fig. 22 is a plan view of a portion of the mechanism for opening and closing the valves which supply the solution to cup or cell.

Fig. 23 shows parts of the vacuum suction mechanism in plan.

Fig. 24 shows a part of the carbon bobbin centering conveyor in plan and also a part of the straightener cross-piece.

Fig. 25 is a front elevation of the vacuum suction mechanism for removing the surplus solution.

Fig. 26 is a side elevation of the cell ejector assembly and conveyor driving mechanism at the rear of the machine.

Fig. 27 shows a part of the liquid reclaiming apparatus.

Throughout the various views of the drawings, similar reference characters designate similar parts.

The machine 1, set forth in this application, is composed of a number of mechanisms for assembling the parts of a dry battery, and finally ejecting the complete cells.

The first, which is designated generically by the character 2, places a cup or cell casing 3 in a conveyor 4.

The second mechanism 5 places a suitable disk 6 of insulating material in the bottom of the cup 3.

The third mechanism 7 places a solution 8 in the cup 3 and the next mechanism 9, removes the surplus solution after the carbon bobbin or core 10, has been put in place by hand, or otherwise, as desired.

Thereafter, the conveyor 4 is passed downwardly by suitable mechanism 11 into a tank 12, where the liquid part of the cell is cooked, and thereby solidifies into a thick paste, and thereafter, the conveyor 4 is raised and then lowered and passed into a cooling mechanism 13 and from there the conveyor passes to the ejecting mechanism 14. These various mechanisms are suitably mounted on the frame 15 and driven by the main shaft 16, as will appear below.

*Mechanism for placing the cam in the conveyor.*

The mechanism 2 for placing the cups in the conveyor is mounted at the front of the machine and is composed of a series of inclined slideways 17, nine being shown, each of which is parallel with all the others, and all are supported by means of suitable brackets 18 mounted on the parallel top rails 19 of the frame 15. These inclined slideways 17 are so arranged and disposed that they hold the cylindrical cans or cells 3 of the batteries so that the cylindrical surface of one is against the cylindrical surface of another and the bottoms are against the bottoms 20 of the slideways 17.

The lower end of each slideway 17 is cut away and a spring pressed bolt 21 normally holds the bottom can 3 in position. This spring-pressed bolt 21 is thrust aside by the can whenever a plunger 22 is forced therein by mechanism which will be described below.

At the bottom of each runway is a suitable slideway 23 in each of which is mounted a plunger 22 which has teeth 24 adapted to engage a segmental gear 25 mounted on a cross shaft 26 which is supported by suitable bearings 27 from the rails 19. To permit a proper meshing of the segmental gear 25 and teeth 24, the slideway 23 is suitably slotted and the end of the plunger 22, which enters the cup, is provided with a suitable spring-pressed head 28 which is adapted to come in contact with the bottom of the can, which is engaged, and eject the same from the slideway 17 and put the same in a suitable pocket on the conveyor 4 which will be described below.

The shaft 26 is rocked at the right time by means of a suitable crank 29 which is fixed thereon and engages a link 30 which is preferably adjustable as to length, and this link 30 is connected to a cam mechanism 31 which is driven by the main shaft 16. It will be understood from the foregoing that once every revolution of the shaft 16, the plungers 22 are all driven forward and back so as to force the cups which they engage into the conveyor 4.

*The conveyor.*

The conveyor 4 runs substantially the length of the machine and is in the form of two endless and parallel sprocket chains 32 connected by suitable cross bars 33 each of which is perforated to correspond with the number of cup rows, and provided with suitable spring clip fingers 34 which are adapted to receive the cups. Each finger 34 is preferably made of a leaf spring having one end secured at 35 to the bar 33 and adjacent to a perforation therein and then this spring extends downwardly and outwardly and then inwardly parallel with the bottom of the can to be received therein and thence upwardly towards the can and then at right angles and parallel to the bottom of the can and thereafter upwardly along the side of the can and finally away from the can so as to flare in the opening of the bar 33. These springs are so arranged and disposed that they will receive and hold the cups as above set forth and hold the same true and yet will not interfere either with the introduction of the cups or their removal.

In Fig. 1$^b$ is shown a clip 34$^a$ which is bent substantially as shown and made of spring metal so as to rest against the side and bottom of the cup which it holds. This form of clip may be substituted for that shown in Fig. 7, if desired.

Near the cup supplying mechanism 2 is mounted a suitable shaft 36 in suitable bearings 37 hung from the side rails 19 and near each rail this shaft 36 carries a sprocket-wheel 38 which receives a chain 32. A similar shaft 39 mounted at the other end of the machine carries corresponding sprocket wheels (not shown) but identical with the sprocket-wheels 38. This shaft 39 also carries a ratchet wheel 40 which is fixed thereon and adapted to engage two pawls 41 and 42 respectively. The pawl 41 is pivotally mounted from a bar 19 in any suitable manner as by a bracket 43 with a pin 44 therein, and the other pawl 42 is carried by a suitable arm 45 to which it is pivotally connected at 46. This pawl 42 is also pivotally connected with a suitable link 47 which runs to an eccentric strap 48 which is driven by an eccentric 49 suitably mounted on the main shaft 16 of the machine.

Intermediate of the sprocket wheels 38 at each end the upper run of the conveyor has other idle sprocket wheels mounted at convenient distances and also other sprocket wheels above the chain for depressing the same into the heating tank and the cooler, as will appear below. Guides 126 are also provided to steady these chains at the bars carrying cups which are being operated on by the various mechanisms of the machine.

In the preferred embodiment of my invention three springs 34 are employed, although more or less may be used as desired. Three have been found to give satisfactory results in actual service.

*The cardboard disk supplying mechanism.*

The cardboard disk supplying mechanism 5 is composed of magazines 50 which hold disks 6 in parallel columns so that one disk may be inserted in each cup; a slide 51 for each reservoir 50 and mechanism for actuating the same and a plunger 52 for forcing each disk into its cup 3 which is also actuated by a mechanism which will be hereinafter described. In addition to this, there is preferably employed an alarm which will indicate the absence of a disk from its cup so that the carelessness of an operator will not permit the machine to run without supplying sufficient disks.

Each reservoir 50 is composed of a vertical tube 53 in which are placed a number of disks 6, one on top of another, and these disks are preferably surmounted by a suitable metal weight 54 which presses upon the same and causes them to pass properly through the reservoir. Each slide 51 has a blade 55 which is substantially the thickness of a disk, and no more, and is so mounted that it can pass under the reservoir, and shove the lowermost disk under the plunger 52. Each slide 51 runs in a suitable guide 56, from which extends upwardly, a suitable bracket 57, at each end and the slide 51 is connected in each instance to a crank arm 58 through a loose pivot 59 and each crank arm 58 is fixed on a suitable transverse shaft 60 which is driven by a suitable crank 61 from a cam mechanism 62 on the main shaft 16 by means of a suitable link 63 which is preferably adjustable as to length. The cam mechanism 62 is so timed that the arm 61 is thrown forward and back once each revolution of the shaft 16 and at the proper time with regard to the other movement of the mechanism herein described.

After a disk 6 has been forced under the plunger 52 by the slide 51 above described, this plunger 52 descends, under the action of a crank 64, to which it is pivotally connected, by a loose pivot. Each crank 64 is fixed to a suitable shaft 65 mounted in suitable brackets 66, at each end, and the shaft 65 is driven by a suitable crank 67, which in turn is driven by a link 68 which is connected to a suitable cam mechanism 69 fixed on the main shaft 16. The link 68 is also made adjustable as to length so that the movement of the plunger 52 may take place throughout the proper space required for its action.

The lower end of each plunger 52 is provided with a suitable spring-pressed head 70 (see Figs. 10 and 11) in the center of which is an insulating sleeve 71 which carries a spring pressed needle 72 which passes through an insulating block 73 near its upper end and into a head 74 which is also spring pressed and made of metal and slides in an insulating sleeve 75 so that the needle 71 is carefully insulated from the head 70 of the plunger 52. The head 74 presses against a spring 76, which is connected to an insulated wire 77 which runs through a suitable opening in the plunger 52 and this wire 77 is provided to a suitable spring finger 78 which is adapted to rub against the plate 79 on the insulation 80 which is fixed to the cylinders 50 which hold the disks 6. The plate 79 is connected to a suitable wire 81 which runs to a binding post 82 supported by any suitable insulating means, as a bracket 83, which is mounted on the upper end of a tube 80 but insulated therefrom, and this post 82 is electrically connected to a spring armature 84 and also by a wire 82$^a$ with a magnet 85 above the armature 84 so that when the magnet 85 is energized, as will appear below, the armature may be raised so as to contact with the core of the magnet 85 and thereby complete a circuit through same for a purpose which will appear below. The winding of the magnet 85 is connected to a wire 85$^a$ which runs to a lamp 86 mounted in any suitable way and at any convenient location, and preferably immediately above the tube 50 for which it is an indicator, as will appear below, and this lamp 86 is connected by a wire 86$^a$ to a battery 86$^b$ which is grounded at 86$^c$ to the frame of the machine. From this it is apparent that when no disk 6 is in the bottom of a cup 3 under the plunger 52 and this plunger descends, as above described, the spring pressed insulated wire 71 will touch the bottom of the cup 3 and form a metallic contact therewith and thereby close a circuit which may be traced from this wire 71 through the wire 72, magnet 85, lamp 86 and battery 86$^b$, and thence to the ground 86$^c$ so that the light 86 will glow and the armature 84 will be attracted to the core of the magnet 85, and when so attracted a circuit will be closed through the bracket 85$^b$, and thence through the wire 85$^c$ to a switch 85$^d$ and from there to a ground 85$^e$ whereby the lamp will glow although no appreciable current will flow through the wire 71 as this part of the circuit is short-circuited. This glow light is an alarm to indicate that the cylinder under it has no disk 6 and as soon as the operator restores this disk he opens the switch 85$^d$ momentarily thereby releasing the armature 84 which falls and then the machine will operate in its normal manner, as is obvious. The operator is not supposed to open the switch 85$^d$ until disks are in place in the cups which have been left without disks as well as in the cylinder 50 over these cups so that no liquid will be poured into these cups until the same are ready to receive the liquid.

The filling mechanism.

As the conveyor advances step by step the cups in a given row, after being supplied with disks, in due season get under the filling mechanism wherein they are supplied with the cooking paste necessary to the batteries. This paste flows from a suitable reservoir 87 which is supported by pipes or tubes 88 and through tubes 89 to the measuring mechanism 90, which will be described below. The paste solution is pumped to the reservoir 87 through any suitable means, as a pipe or a tube. The measuring apparatus 90 has a number of tubes each of which is connected to a valve or cock 91. Each of these cocks 91 is actuated by a suitable crank 92 which engages a grooved disk 93 which is mounted on a screw shaft 94 which does not turn but shifts in the direction of its length in suitable bearings 95 located near each end. The purpose of making the disks 93 with screw thread perforations going through their centers, is to make them so that they may be adjusted. To secure them in place it is preferable to use suitable locknuts 96. At one end of the shaft 94 is placed a suitable clevis 97 which is connected in a peculiar way to a lever 98 fulcrumed at 99 and connected to suitable link 100, in the usual manner, which is adjustable as to length, the same as the others, and runs to a suitable cam 101 on the main shaft 16 so that at the correct time the respective valves 91 will all be opened and closed. The peculiar way the lever 98 is connected to the link 100 is as follows: This lever 98 turns free on the pivot 99 and so do the parallel arms 98$^a$ which are pivotally connected at their outer ends to the link 100 by a pivot 98$^b$, and the parts 98 and 98$^a$ are also connected by a latch 98$^c$ which is pivotally mounted between the links 98$^a$ on a pivot 98$^d$. The latch 98$^c$ has a foot adapted to engage a shoulder 98$^e$ on the lever 98 and its other end is adapted to engage a set screw 98$^f$ mounted in a bracket 98$^g$ which is fixed to the frame of the machine. The latch 98$^c$ is connected to the lever 98 by a spring 98$^h$ so that when the latch 98$^c$ is forced clear of the shoulder 98$^e$ the spring 98$^h$ causes a quick cutoff and closes the valves, almost instantaneously. This action is further facilitated by means of a cushion 94$^a$ of rubber or similar material which is held by a bracket 94$^b$ so as to be compressed by the end thrust of the rod 94 when the valves are open.

The valves 91 run to suitable stud pipes 102 which are connected to hand valves or cocks 103 and these in turn run to a second set of stud pipes 104 which have their openings over the cups 3 so that they discharge into the same at the proper time and all discharge at once, the supply being turned off or on all at the same time by means of the mechanism above described. If, for any reason, any pipe is not supplying the cups that come under it, the valve 103 of this pipe is shut off by hand.

The vacuum surplus solution removing mechanism.

After the cups have been filled as above described, they are taken up by the conveyor 4 to the surplus solution removing mechanism. Between the paste supplying mechanism and the mechanism for removing the surplus paste, mechanism may be interposed for placing the carbon bobbin cores in the paste. Such mechanism is not shown as it is understood that in the machine herein shown and described, the cores are placed by hand. As these cores vary more or less, as to size and are not of uniform volume, they displace more or less paste when put in place, and this displacement varies the level of the paste in the filled cups. As this variation in filling is undesirable and wasteful, the surplus removing mechanism 9 is employed to bring all these surfaces to the same level. This surplus removing mechanism consists essentially of a vacuum chamber or suction manifold 105 which is supported by suitable clamps and exhausted by any suitable means, such as a vacuum pump. This pump and its connections are shown in Fig. 27 where the suction manifold 105 is connected to a pipe 105$^a$ that runs to a closed receiving chamber 105$^b$ which has a drain pipe 105$^c$ running through a valve 105$^d$ to a closed storage vessel 105$^e$. The pipe 105$^a$ extends to near the bottom of the vessel 105$^b$ and below the liquid level if any amount of liquid accumulates in this vessel and air is exhausted through a pipe 105$^f$ which leaves at the top and runs to the bottom of a second closed safety vessel 105ᵍ, and from the top of this a pipe 105ʰ runs to an exhaust pump 105ⁱ which forces air from the apparatus. This pump is run from a motor 105ʲ through a belt 105ᵏ, or any other suitable means. By disconnecting the vessel 105ᵉ, the surplus liquid may be recovered and later reused, and this may be done at any time without disturbing the exhaust because of the valve 105ᵈ.

Extending from the suction manifold 105 are a plurality of flexible suction pipes 106 which extend to nozzles 114 which are slidably mounted in a suitable crossing 113 pivoted in rocker arms 107 suitably mounted on a pivot 108, suported by a pedestal 109 secured to a sill 19. It is to be understood that two such pedestals, arms and pipes are employed, one on each side of the machine. The levers 107 are oscillated through a very small arc by means of a crank 110 and link 111 which may be extended or shortened by a suitable turn-buckle, and this link 111 gets its proper reciprocation from a suitable cam mechanism 112 connected to the main shaft 16. The arms 107 are fixed to the pivot 108 so as to oscillate together. The vacuum chamber 105 has suitable connections with the filling chamber 87 (not shown) so that the excess paste will flow temporarily into this chamber 105 and later will be placed where it can be used over again without waste.

The series of pipes 106 run to suitable nozzles 114, which are slidably mounted in a suitable crossing 113 so that they will move in a vertical direction only when the arms 107 are oscillated. A parallel movement 115 keeps the pipes 106 erect.

These nozzles 114 have the positions of their lower ends determined by suitable lock nuts 116 which are pressed against the bar 113 by the tension of suitable coil springs 117 so that each nozzle may be so placed that it will be resiliently supported with its lower ends at the proper level. If the core should be out of place or some other obstruction strike the lower end of a nozzle 114 the nozzle can lift so as to avoid breakage. Under normal conditions, the lower end of each nozzle 114 enters a little below the upper surface of the liquid or paste and removes the surplus by sucking the same through suitable passages 118 which are preferably placed concentric with central opening 119 of the nozzle, and this opening 119 is so placed that it will clear the carbon core 10 and its lower end is flared so as to tend to bring the carbon core 10 to a central position if it should be slightly out of true. These nozzles 114 are preferably recessed, as shown at 114ᵃ to avoid disturbing the liquid which remains in a cup. It will be understood from the foregoing that the suction is entirely through the passages 118 and that the central opening 119 is not connected therewith so that the suction is never in any way interfered with by this opening 119. When the lower end of the nozzle 114 is no longer below the upper surface of the paste or liquid 8, further suction of liquid becomes impossible as air enters the openings 118, and immediately thereafter the nozzles 114 are lifted clear of the conveyor and clear of the cup 3 and are in a position which will enable them to be lowered at the proper time so that the foregoing cycle of operation may be repeated.

*The core centering and paste heating operation.*

From the surplus paste removing mechanism the conveyor takes the cans with their contents, one row at a time, under the centering mechanism 11 and into the heating tank 12.

The centering mechanism consists of sprocket wheels 120 mounted in pairs on shafts 121, which are journaled in bearings 122 which are mounted on the sills 19. These sprocket wheels 120 carry parallel and suitable endless sprocket chains 123 which are uniform with the chains 32 and are connected at intervals by the centering bars 124 which are spaced the same as the bars 33 so that the bars 124 will be exactly true and over the cups 3 when the same pass into the heating tank 12. The tapering shaped openings in the bars 124 cause the cores 10 to be properly centered. The edge recesses 124 permit the trapping of any liquid or any disturbance thereof. Suitable sprocket wheels 125, similar and identical in pitch circle to the wheels 120, and mounted on the same axles, cause the chains 32 to be depressed when passing through the heating tank 12. To assure the correct alignment of these chains 32, guides 126 are provided at each side of the tank 12. The liquid (such as water) in the tank 12 is sufficiently hot to make the paste harden in the cups 3 and is regulated with a thermostat to control its temperature. The chains 123 run intermittently, the same as the chains 32, and in due season take the cups 3 out of the tank 12 at the end of the proper time required for cooking cells.

*The cooling mechanism.*

As shown in Fig. 1ᵃ, the conveyor passes upwardly over idle rollers, after leaving the heating apparatus, and the centering mechanism 11, and continues for a moment at the upper level of the bars 19, and thereafter the chains 32 are depressed by suitable sprocket wheels 128 mounted on a shaft 129 journaled in suitable bearings 130, as shown. These sprocket wheels 128 cause the cans with their contents to enter the cooling mechanism 13 where a cooling liquid such as water is employed, and a second sprocket wheel 131 mounted the same as the sprocket wheel 128 on a shaft 132 running in journals 133 to permit the chains 32 to emerge from the cooling tank 13 and run over suitable idle rolls which place them at the top of the side frame 19. The cans 3 are now filled and provided with their cores, and the cells are complete and are ready for the ejecting mechanism to remove them from the apparatus.

*The cup ejecting mechanism.*

The ejecting mechanism is shown at the right of Fig. 1ª, and also somewhat in detail in Figs. 2 and 3. On the inside of the sills 19 and near the rear ends are located downwardly extending brackets 134, which are united by a crossing 135, which is provided with parallel and vertical perforations which receive the ejecting plungers 136, each of which is in alignment with a cup 3 and is provided with means described below, for ejecting each cup by raising the same vertically and clear of the springs 34 and crossing 33 and level with the table 137 of the machine which will be described below. Each plunger 136 is connected to a suitable crank 138 by means of a loose pivot connection 139, and each crank 138 is fixed on an oscillating shaft 140 with its ends mounted in the bracket 134. The shaft 140 is oscillated by means of a suitable crank and link connection 141 which runs to a suitable cam, not shown, on the main shaft of the machine.

Another extension of the bracket 134 carries a shaft 142 on which are mounted a number of crank arms which are fixed thereto. One of these arms 143 is connected to a suitable coil spring 144 which is secured at its upper end to a fixed part of the machine and the upper edge of a sill 19. This spring 144 is a retractive spring which normally holds the arm 143 in the position shown. Another arm 145 is fixedly mounted on the shaft 142 and is connected by a loose pivot to a link 146 which runs to a suitable cam mechanism 146ª on the main shaft 16, which causes this link to reciprocate once in each revolution. Yet another arm 147 is one of a pair which runs in a substantially vertical direction to above the level of the table 137 where it is attached by links 148 to a suitable slide 149 which has fixed therein a number of parallel fingers 150 which enter corresponding openings in the ends of the vertical division plates 151.

The cams which drive the links 141 and 146 are so timed that at the proper time, when a bar 33 with its cups 3 is under suitable perforations 152 in the table 137, the plungers 136 are elevated and thereby caused to lift the row of cups 3 above the level of the table 137 while the upper ends of the plungers 136 are above the level of the table, and with a sweeping movement of the slide 149 the cups are moved from over the perforation 152 on to the table 137, above described, and before these plungers 136 are lowered, the action of the cam driving the link 146 is such that this link is raised and thereby forces the slide 149 backward against the vertical division plate 151, or in that direction, and thereby shoves a row of cans 3 into the respective lines between these division plates, as indicated in Fig. 3. The plungers 136 are then withdrawn and the slide 149 is also withdrawn, and the cycle above described is repeated indefinitely. From time to time the filled cans, that is the complete cells, are removed from the machine.

*Operation.*

In view of the foregoing, the operation of my improved machine will be readily understood. Assuming that the magazines are full of their respective cans and disks and the paste chamber has suitable paste, the empty cans 3 are first loaded into the conveyor 4, above described, and then the disks 6 are placed on the bottom thereof, and next the cans are filled to the proper level with the paste 8, then the cores 10 are inserted by hand, in the embodiment of my invention herein shown, although they may be inserted by machine if desired, or otherwise, and then the surplus paste is removed by the vacuum apparatus above described. After the paste is removed the cans are first heated to cook the paste while the cores are held in a central position, and then the cans are passed from a heating to a cooling device wherein the cans are cooled and the paste is solidified and made hard, and then the cans are passed in the complete form, duly loaded, to the ejecting mechanism where they are ejected, and made ready for packing and shipping.

The machine may be driven from any suitable source of power, as a motor 153 which may be belted by a belt 154 to a suitable worm gear 155 which drives the pinion 156 which meshes with a gear 157 on the main shaft, or the machine may be driven in any other suitable way.

Various elements of the mechanism disclosed herein form the subject matter of my divisional applications as follows: Serial No. 305,014, filed June 18th, 1919; Serial No. 345,916, filed December 18th, 1919. Serial No. 345,917 filed December 18th, 1919 and Serial No. 348,637, filed December 31st, 1919.

While I have shown and described one embodiment of my invention, it is obvious that it is not restricted thereto, but is broad enough to cover all structures that come within the scope of the annexed claims.

Having thus described my invention, what I claim is:

1. In a machine of the class described, the combination with a conveyor for holding a plurality of receptacles, means for moving said conveyor, mechanism for inserting a disk in each of said receptacles while held by the conveyor, mechanism for filling said receptacles with a liquid solution, mechanism for removing surplus solution from each receptacle, means for heating the filled receptacles, means for cooling the same, and means for ejecting said receptacles from the conveyor after the above mentioned operations have been performed.

2. In a machine of the class described, the combination with a conveyor for carrying a plurality of receptacles adapted to be filled, means for moving said conveyor, mechanism for inserting a disk in each of said receptacles while held by the conveyor, mechanism for filling said receptacles with a liquid solution after the insertion of the disks has taken place, mechanism for removing surplus solution, means for heating the filled receptacles, means for cooling the same after the heating operation has taken place, and means for ejecting the filled receptacles from the conveyor after the above mentioned operations have been performed.

3. In a machine of the class described, the combination with a conveyor for holding a plurality of receptacles, means for moving said conveyor, mechanism for inserting a disk in each of said receptacles, mechanism for filling said receptacles with a liquid solution, mechanism for removing surplus solution, means for heating the filled receptacles, and means for cooling the same, all of said mechanisms being adapted to act on said receptacles while the same are carried by the conveyor, and means for ejecting the filled receptacles from the conveyor.

4. In a machine of the class described, a conveyor and means for moving the same, mechanism for inserting receptacles in said conveyor, mechanism for inserting a disk in each receptacle transported by the conveyor, mechanism for supplying paste to each receptacle after the insertion of the disk, mechanism for removing surplus paste from each receptacle, mechanism for centering a core placed in each receptacle, a heating device for each receptacle and its contents, and a cooling device operating on the receptacles after the operation of the heating device.

5. In a machine of the class described, a conveyor and means for moving the same, mechanism for inserting receptacles in said conveyor, mechanism for inserting a disk in each receptacle transported by the conveyor, mechanism for supplying paste to each receptacle after the insertion of the disk, mechanism for centering a core placed in each receptacle, a heating device for the receptacles and their contents, a cooling device operating on the receptacles after the operation of the heating device, and a device for ejecting the filled receptacles from the conveyor.

6. In a machine of the class described, a conveyor and means for moving the same, mechanism for inserting the receptacles in said conveyor, mechanism for inserting a disk in each of the receptacles while held by the conveyor, and means for supplying paste to said receptacles on top of the disks inserted therein by the disk inserting mechanism.

7. In a machine of the class described, a conveyor, means for moving the same, mechanism for inserting receptacles in said conveyor, disk inserting mechanism to which the receptacles are carried by the conveyor, paste supplying mechanism and means for centering a core in each of said receptacles while held on the conveyor.

8. In a machine of the class described, a conveyor, means for moving the same, mechanism for inserting receptacles in said conveyor, mechanism for inserting disks in each of the receptacles held by the conveyor, mechanism for supplying paste to said receptacles, mechanism for removing surplus paste therefrom, mechanism for centering a core in each of said receptacles, and heating and cooling devices for the filled receptacles.

9. In a machine of the class described, a conveyor and means for driving the same, mechanism for inserting receptacles in said conveyor, mechanism for inserting a disk in each of the receptacles held by the conveyor, mechanism for supplying paste to said receptacles on top of the disk in each receptacle, and mechanism for removing surplus paste from each receptacle after the insertion of a core therein.

10. In a machine of the class described, a conveyor and means for driving the same with an intermittent movement, means for supplying receptacles to said conveyor, and means on said conveyor to receive and carry said receptacles, disk inserting mechanism to which said receptacles are carried by the conveyor, paste supplying means, surplus paste removing means, heating means and cooling means, all of said means adapted to operate while the receptacles are supported and carried by the conveyor and means for ejecting filled receptacles from the conveyor.

11. In a machine of the class described, the combination with a conveyor for holding a plurality of receptacles, means for moving said conveyor, mechanism for inserting a disk in each of said receptacles while held by the conveyor, mechanism for filling each of said receptacles with a liquid solution, mechanism for removing surplus solution from each receptacle, mechanism for centering a core in each receptacle, means for heating the filled receptacles, means for cooling the same, and means for ejecting the filled receptacles from the conveyor after the above mechanisms have acted upon the same.

12. In a machine of the class described, a conveyor and means for driving the same, mechanism for inserting receptacles in said conveyor, means on said conveyor adapted to receive and carry said receptacles, mechanism for inserting a disk in each of said receptacles, held by the conveyor, mechanism for supplying paste to said receptacles on top of the disk in each receptacle and mechanism for removing surplus paste from each receptacle, leaving a predetermined amount of said paste therein.

13. In a machine of the class described, a conveyor and means for driving the same, means on said conveyor for receiving and holding a plurality of receptacles, a plurality of plungers adapted to insert receptacles in said conveyor, a plurality of plungers for inserting disks in said receptacles while held on the conveyor, means for supplying a liquid solution to said receptacles while held on the conveyor, heating means for said receptacles, cooling means adapted to act on said receptacles after the heating means and means for ejecting the receptacles from the conveyor.

14. In a machine of the class described, a conveyor and means for driving the same, means on said conveyor for receiving and holding a plurality of receptacles, a plurality of plungers adapted to insert receptacles in said conveyor, means for inserting disks in said receptacles while held on the conveyor, means for supplying a liquid solution to said receptacles while held on the conveyor, heating means comprising a reservoir of heating liquid through which the conveyor carries the receptacles and means for ejecting the receptacles from the conveyor.

15. In a machine of the class described, a conveyor and means for driving the same, means on said conveyor for receiving and holding a plurality of receptacles, means for supplying receptacles to said conveyor, receptacle filling means, means for heating the filled receptacles while held on the conveyor, comprising a reservoir adapted to contain heated liquid through which the filled receptacles are carried, means for cooling the receptacles thus heated, comprising a reservoir adapted to contain cold liquid through which the receptacles are carried by the conveyor, and means for ejecting the receptacles from the conveyor.

16. In a machine of the class described, a conveyor, means for moving the same, mechanism for inserting a plurality of receptacles in said conveyor, mechanism for inserting a disk in each receptacle while held on the conveyor, mechanism for supplying paste to said receptacles on the conveyor and on top of the disks contained in said receptacles, heating means for said receptacles comprising a reservoir adapted to contain heated liquid through which the filled receptacles are carried by the conveyor, and means for ejecting said filled receptacles from the conveyor.

17. In a machine of the class described, a conveyor, means for inserting receptacles in said conveyor, mechanism for inserting a disk in each of said receptacles on the conveyor, mechanism for supplying paste on top of each disk in each receptacle, heating means for said receptacles comprising a reservoir adapted to contain heated liquid through which the filled receptacles are carried by said conveyor, cooling means comprising a reservoir adapted to contain cool liquid through which the filled and heated receptacles are carried by the conveyor, and ejecting means for ejecting the filled receptacles from the conveyor.

18. In a machine of the class described, a conveyer, means for inserting receptacles in said conveyor, means for inserting a disk in each one of the receptacles held on the conveyor, mechanism for supplying paste in each receptacle and on top of the disk resting therein, means for heating the filled receptacles, a core centering device acting simultaneously with the heating mechanism, and ejecting mechanism for removing the filled receptacles from the conveyor.

19. In a machine of the class described, a conveyor, a plurality of plungers for inserting receptacles in said conveyor, mechanism for inserting a disk in each receptacle while the same is held on the conveyor, mechanism for supplying paste to each receptacle and on top of the disk held therein, heating mechanism for the filled receptacles, a core centering device acting simultaneously with the heating mechanism, a cooling mechanism comprising a reservoir adapted to contain a cold liquid through which the filled receptacles are carried by the conveyor, and means for ejecting the filled receptacles from the conveyor after the cooling operation has taken place.

20. In a machine of the class described, a conveyor and means for moving the same, mechanism for inserting receptacles in said conveyor, mechanism for inserting a disk in each of the receptacles while held by the conveyor, means for supplying paste to said receptacles on top of the disks inserted therein by the disk inserting mechanism, a heating device comprising a reservoir adapted to contain heated liquid through which the receptacles on the conveyor are passed, and a core centering mechanism acting simultaneously with said heating mechanism.

21. In a machine of the class described, a conveyor and means for moving the same, means on said conveyor for receiving and holding receptacles, a plurality of plungers for inserting receptacles in said receptacle holding means on the conveyor, means for inserting a disk in each of the receptacles, means for supplying a liquid to each of the receptacles on the conveyor, means for removing surplus liquid therefrom, a heating means for the receptacles, and a core centering means acting simultaneously with the heating operation.

22. In a machine of the class described, a conveyor, a means for driving the same, receptacle inserting mechanism for supplying receptacles to said conveyor, a plurality of plungers for inserting a disk in each receptacle, and a liquid supplying mechanism for supplying liquid to said receptacles, and on top of the disks placed therein by the disk inserting mechanism.

23. In a machine of the class described, a conveyor, and means for driving the same, a receptacle inserting mechanism for supplying receptacles to said conveyor, a plurality of plungers for supplying a disk in each receptacle while held on the conveyor, means for supplying liquid to each receptacle, mechanism for removing surplus liquid from each receptacle after a core has been inserted in said receptacle.

24. In a machine of the class described, a conveyor and means for driving the same, means for inserting a plurality of receptacles in said conveyor, a plurality of plungers for inserting a disk in each receptacle, means for supplying a liquid to said receptacles, and means for removing surplus liquid therefrom and leaving a predetermined amount in each receptacle, a reservoir adapted to contain a heated liquid through which the receptacles are adapted to be carried, and means for ejecting the filled receptacles from the conveyor.

25. In a machine of the class described, the combination of the conveyor for holding a plurality of receptacles, means for moving said conveyor, mechanism for inserting a disk in each of said receptacles while held by the conveyor, mechanism for filling said receptacles with a solution, mechanism for removing surplus solution from each receptacle, means for centering a core in each receptacle, means for heating the filled receptacle, and means for ejecting said receptacles from the conveyor after the above mentioned operations have been performed.

26. In a machine of the class described, a conveyor, and means for moving the same, mechanism for inserting receptacles in said conveyor, mechanism for inserting a disk in each of the receptacles while the same are held by the conveyor, electrical means for detecting failure of the disk inserting mechanism to supply disks to the receptacles, and means for supplying paste to said receptacles on top of the disks inserted therein by the disk inserting mechanism.

27. In a machine of the class described, a conveyor, means for driving the same, receptacle inserting mechanism for supplying receptacles to said conveyor, a plurality of plungers for inserting a disk in each receptacle, means for detecting failure of the disk inserting mechanism to supply disks to the receptacles, and a liquid supplying mechanism for supplying liquid to said receptacles and on top of the disks placed therein.

28. In a machine of the class described, a conveyor, means for moving the same, mechanism for inserting receptacles in said conveyor, mechanism for inserting disks in each of the receptacles held by the conveyor, mechanism for supplying paste to said receptacles, mechanism for removing surplus paste therefrom, mechanism for centering a core in each receptacle, a heating device for said receptacles, and means for causing the core centering device to become operative upon the commencement of the heating operation, and to become inoperative upon the completion of the heating operation.

29. In a machine of the class described, a conveyor, means for moving the same, mechanism for inserting receptacles in said conveyor, mechanism for inserting a disk in each of the receptacles held by the conveyor, mechanism for supplying paste to said receptacles, mechanism for removing surplus paste therefrom, and leaving a predetermined amount of paste in each of said receptacles, mechanism for centering a core in each of said receptacles, and a heating device for the filled receptacles.

30. In a machine of the class described, the combination with a plurality of slides in which a number of receptacles rest, a plunger at the lower end of each of said slides, a conveyor, means for actuating the plungers to cause the same to insert receptacles in the conveyor, mechanism for inserting a disk in each of said receptacles while held by the conveyor, mechanism for filling said receptacles with a liquid solution, mechanism for removing surplus solution from each receptacle, means for heating the filled receptacles, and means for ejecting said receptacles from the conveyor after the above mentioned operations have been performed.

31. In a machine of the class described, the combination with a conveyor for holding a plurality of receptacles, means for moving said conveyor, mechanism for inserting a disk in each of said receptacles while held by the conveyor, mechanism for filling said receptacles with a liquid solution, mechanism for removing surplus solution from each receptacle, means for heating the filled receptacles, and a plurality of plungers moving beneath the filled receptacles, and ejecting the same from the conveyor.

32. In a machine of the class described, the combination with a conveyor for holding a plurality of receptacles, means for moving said conveyor, mechanism for inserting a disk in each of said receptacles while held by the conveyor, mechanism for filling said receptacles with a liquid solution, mechanism for removing surplus solution from each receptacle, means for heating the filled receptacles, and a plurality of plungers moving beneath the filled receptacles and forcing the same out of the conveyor and a slide for moving said receptacles onto a receiving surface.

33. In a machine of the class described, the combination with a conveyor for holding a plurality of receptacles, means for moving said conveyor, means for heating the receptacles, means for holding a core central in each of said receptacles while the heating operation takes place, and means for removing the receptacles from the conveyor after the above operations have been performed.

34. In a machine of the class described, the combination with a conveyor for holding a plurality of receptacles, means for moving said conveyor, means for filling said receptacles, means for heating the filled receptacles, means for holding a core central in each of said receptacles while the heating operation takes place, and means for removing the receptacles from the conveyor after the above operations have been performed.

35. In a machine of the class described, a conveyor, means for moving the same, mechanism for inserting a plurality of receptacles in said conveyor, mechanism for inserting a disk in each receptacle while held on the conveyor, mechanism for supplying paste to said receptacles on the conveyor and on top of the disks contained in said receptacles, heating means for said receptacles comprising a reservoir adapted to contain heated liquid through which the filled receptacles are carried by the conveyor, and means for holding a core central in each receptacle during the heating operation.

LOUIS A. FREEDMAN.